United States Patent Office 3,506,631
Patented Apr. 14, 1970

---

3,506,631
PROCESS FOR PREPARING COPOLYMERS OF CONJUGATED DIENES WITH ALKENYL ARYL COMPOUNDS
Adel F. Halasa, Akron, Ohio, assignor to The Firestone Tire & Rubber Company, Akron, Ohio, a corporation of Ohio
No Drawing. Filed Dec. 14, 1967, Ser. No. 690,429
Int. Cl. C08d 1/20; C08f 1/76
U.S. Cl. 260—83.7         15 Claims

ABSTRACT OF THE DISCLOSURE

The process disclosed herein involves the copolymerization of diene and vinyl aryl compounds, such as butadiene and styrene, in the presence of a modifier, namely an aliphatic or aromatic phosphite, thiophosphite or amidophosphite which overcomes the tendency of the vinyl aryl, that is styrene, etc., to form a block copolymer with the diene, e.g. butadiene, and also causes the monomers to copolymerize at a constant rate so that the resultant copolymer has a constant composition throughout its linear chains. Moreover, whereas amines and ethers have the ability to prevent such block polymer formation, they have the disadvantage of increasing the 1,2-microstructure of the copolymer from the usual 8% to as high as 50%. In contrast the phosphite modifiers effect little or no increase in the 1,2-microstructure. The phosphites suitable for this purpose have one of the formulas $(RO)_3P$, $(RS)_3$ or $(R_2N)_3P$ where R is a hydrocarbon group of 1–12 carbon atoms.

BACKGROUND OF THE INVENTION

Field of the invention

This invention relates to diene-vinylaryl copolymers, such as butadiene-styrene copolymers, and a process for producing them in such a manner that the copolymerization rate is increased without the formation of block polystyrene, or other polyvinylaryl, in the copolymer and without increasing the 1,2-microstructure of the butadiene portion.

Related prior art

In the copolymerization of two monomers, such as butadiene and styrene, the resulting copolymer has a greater number of repeating units of the monomer which polymerizes at a faster rate whether this is due to higher molar proportion or stronger polymerization tendency of this monomer. Consequently it is to be expected that there would be a number of adjacent repeating units of the same type derived from the monomer polymerizing at the faster rate. In other words, the repeating unit appearing more frequently in the copolymer must necessarily have similar repeating units adjacent to each other, and the repeating unit derived from the slower monomer will appear less frequently. Desirably the repeating units from the slower monomer should be separated from each other by one or more repeating units of the faster monomer.

Where styrene repeating units appear adjacent to each other in blocks of two or more, the copolymer is referred to as having a "block polystyrene" structure. Since more desirable properties are obtained when the styrene repeating units are more constantly or uniformly interspersed in the linear chain of the butadiene-styrene copolymer, the block polystyrene structure is preferably avoided. Therefore, where modifiers are added to the monomer mixture to be used in a copolymerization, it is important that the modifier does not cause any undesirable side effects such as the formation of block polystyrene.

For some purposes, it is also undesirable to have a considerable percentage of the butadiene repeating unit in the 1,2-microstructure, which is also sometimes referred to as the vinyl-1,2 form.

U.S. Patent No. 2,975,160 and British Patent 1,066,667 show the use of polar compounds such as ethers, thioethers and amines for enhancing the copolymerization rate of styrene and butadiene. However, while these modifiers simultaneously avoid the formation of block polystyrene they have the disadvantage of causing an increase in the proportion of 1,2-microstructure in the butadiene portion from about 8 percent to as high as 50 percent.

British Patent 1,029,445 teaches the use of cocatalysts to be used with alkyllithium and related anionic polymerization catalysts to avoid block polymer formation. However, these cocatalysts are insoluble and have to be used in slurry form. This makes it difficult to use accurate amounts of catalyst, makes it difficult to sample the product and thereby in general gives erratic results.

SUMMARY OF THE INVENTION

In accordance with the present invention, it has been found that the rate of copolymerization of styrene or other vinylaryl and butadiene or other diene can be increased without increasing the percentage of 1,2-microstructure of the butadiene in the copolymer and without allowing the styrene to form block polystyrene in the polymer chain as is otherwise the normal result in such anionic copolymerizations. The amount of phosphite modifier suitable for this purpose is the range 0.25–2 millimoles of phosphite per millimole of alkyllithium or other anionic polymerization catalyst.

The phosphites suitable for this purpose are represented by the formulas:

$(RO)_3P$, $(RS)_3P$ and $(R_2N)_3P$ wherein R is a hydrocarbon group having 1–12 carbon atoms including alkyl, alkenyl, aryl, alkaryl, aralkyl, cycloalkyl, and derivative groups thereof in which the derivative groups are non-reactive with the alkyllithium catalyst.

Typical phosphites that are suitable for the practice of this invention include but are not restricted to the following phosphites: trimethyl, triethyl, tripropyl, tributyl, trihexyl, trioctyl, tridecyl, trinonyl, tridodecyl, triphenyl, tritolyl, trixylyl, trinaphthyl, tri(methylnaphthyl), tribenzyl, triphenethyl, tri(phenylpropyl), tricyclohexyl, tricycloheptyl, tri(cyclohexylmethyl), tri(cycloheptylethyl), trivinyl, tristyryl, triallyl, tributenyl, tri(butyn-2-yl), tri(propyn-1-yl), etc. Also suitable for this invention are the corresponding thiophosphites, and also amidophosphites of which the following are typical: tri(dimethylamido) phosphite, tri(diethylamido) phosphite, tri(dihexylamido) phosphite, tri(didodecylamido) phosphite, tri(diphenylamido) phosphite, tri(ditolylamido) phosphite, tri(dicyclohexylamido) phosphite, tri(dibenzylamido) phosphite, tri(diphenethylamido) phosphite, etc.

Mixed phosphites in which combinations of various alkyl, aryl, cyclohexyl etc. groups are present such as methylethylpropyl phosphite, methyl diethyl phosphite etc. are likewise suitable. However since they are not as readily available and there is no particular advantage to their use, the phosphites with similar groups are preferred.

While some of the above phosphites may not be reported in the literature they can be prepared by standard reactions of phosphorus trichloride, etc., with the appropriate alcohol, phenol, mercaptan or disubstituted amine according to conditions described in Kosolapoff's book on "Organophosphorus Compounds" published in 1950 by John Wiley & Sons, Inc.

In addition to the above phosphites, corresponding phosphites are considered equivalent for this purpose which have derivative groups thereon which are inert to the catalyst materials under the conditions of polymerization.

While copolymers of all proportions of diene and monovinyl aromatic compounds are broadly embraced by the invention, it is preferred that the copolymers contain from about 5 to about 50% monovinyl aromatic compound and correspondingly from about 95 to about 50% butadiene-1,3 or other diene.

Various vinyl aryl compounds that can be used include: styrene, α-methylstyrene, 1-vinylnaphthalene, 2-vinylnaphthalene, α-methylvinylnaphthalene and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include: 4-isopropenyltoluene; 3-methylstyrene (3-vinyltoluene); 3,5-diethylstyrene; 4 - n-propylstyrene; 2,4,6-trimethylstyrene; 4-dodecylstyrene; 3 - methyl-5-n-hexylstyrene; 4-cyclohexylstyrene; 4 - phenylstyrene; 2-ethyl-4-benzylstyrene; 4-p-tolylstyrene; 3,5 - diphenylstyrene; 2,4,6-tri-tert-butylstyrene; 2,3,4,5 - tetramethylstyrene; 4-(4-phenyl-n-butyl)styrene; 3 - (4-n-hexylphenyl) styrene; 4-methoxystyrene; 3,5-diphenoxystyrene; 3-decylstyrene; 2,6-dimethyl-4-hexoxystyrene; 4 - dimethylaminostyrene; 3,5-diethylaminostyrene; 4 - methoxy-6-di-n-propylaminostyrene; 4,5-dimethyl-1-vinylnaphthalene; 3-ethyl-1-vinylnaphthalene; 6-isopropyl-1-vinylnaphthalene; 2,4-diisopropyl-1-vinylnaphthalene; 3,6 - di-p-tolyl-1-vinylnaphthalene; 6-cyclohexyl-1-vinylnaphthalene; 4,5-diethyl-8-octyl-1-vinylnaphthalene; 3,4,5,6 - tetramethyl-1-vinylnaphthalene; 3,6-di-n-hexyl-1-vinylnaphthalene; 8-phenyl-1-vinylnaphthalene; 5-(2,4,6 - trimethylphenyl) - 1-vinylnaphthalene; 3,6-diethyl-2-vinylnaphthalene; 7-dodecyl-2-vinylnaphthalene; 4 - n - propyl - 5 - n - butyl - 2 - vinylnaphthalene; 6-benzyl-2-vinylnaphthalene; 3 - methyl-5,6-diethyl-8-n-propyl-2-vinylnaphthalene; 4 - o-tolyl-2-vinylnaphthalene; 5-(3-phenyl-n-propyl)-2 - vinylnaphthalene; 4-methyl-1-vinylnaphthalene; 6 - phenyl-1 - vinylnaphthalene; 3,6-dimethylamino-1-vinylnaphthalene; 7 - dihexyl-2-vinylnaphthalene; 4 - methyl-α-methylstyrene; 2-ethyl-5-isopropenylstyrene.

In addition to butadiene-1,3, various other conjugated dienes can be used in the copolymerization according to this invention, such as isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4 - dimethyl - 1,3-hexadiene, 3-n-propyl-1,3-pentadiene, 4,5-diethyl-1,3-octadiene, phenyl-1,3-butadiene, 2,3-diethyl-1,3-butadiene, 2,3-di-n-propyl - 1,3-butadiene, 2-methyl-3-isopropyl-1,3-butadiene and the like.

The preferred catalysts for the copolymerizations of this invention are alkyllithium compounds but the hydrocarbon lithium compounds are generally operable to produce the improved copolymers of the invention and are hydrocarbons having, for example, from 1 to 40 carbon atoms in which 1 to 4 lithium atoms have replaced hydrogen. Suitable lithium hydrocarbons include, for example, alkyl lithium compounds such as methyl lithium, ethyl lithium, butyl lithium, amyl lithium, hexyl lithium, 2-ethylhexyl lithium, n-dodecyl lithium and n-hexadecyl lithium. Unsaturated lithium hydrocarbons are also operable, such as allyl lithium, methallyl lithium and the like. Also operable are the aryl, alkaryl, and aralkyl compounds, such as phenyl lithium, the several tolyl and xylyl lithiums, alpha- and beta-naphthyl lithium and the like. Mixtures of such hydrocarbon lithium compounds may also be employed. For example, desirable catalysts may be prepared by reacting an initial hydrocarbon lithium compound successively with an alcohol and then with an olefin such as isopropylene (a technique analogous to the "Alfin" technique), whereby a greater or lesser proportion of the lithium from the initial hydrocarbon goes to form lithium alkoxide and to form a new organolithium compound with the olefin.

Surprisingly, the catalytic action of the hydrocarbon lithium catalysts employed to produce the copolymers of the invention does not appear to be affected by the presence of salts of other alkali metals as impurities. For instance, in the synthesis of hydrocarbon alkali metal compounds, alkali metal halides are produced as byproducts, while in catalysts produced by the "Alfin" technique, alkali metal alkoxides are formed. Where in other polymerization reactions alkali metals other than lithium are employed, either in the form of the metal alone or in alkali metal hydrocarbons, these extraneous compounds exert a different effect upon the structure produced.

Also suitable for this purpose are the other anionic polymerization catalysts listed in U.S. Patent No. 3,317,918, such as the polylithium hydrocarbons, lithium dihydrocarbon amides, metallic lithium, salt mixtures with colloidally dispersed lithium metal, composites of a fluorine-containing salt and lithium metal or lithium hydrocarbon.

It is essential that air be excluded during the preparation of all of the catalyst materials described. Thus, whether the catalyst be lithium metal or lithium-containing compounds it is necessary that the catalyst be prepared in closed containers provided with means for exclusion of air. Preferably, the catalyst will be employed shortly after preparation, although the catalyst may be stored for reasonable periods of time if substantial contact with the atmosphere is prevented during removal from the vessel in which the catalyst is prepared, during storage and during subsequent introduction into the reaction chamber. As will be illustrated, the catalyst often may be produced in situ in the reaction vessel.

In general, the larger the amount of catalyst used, the more rapidly the polymerization will proceed at a given temperature and the lower the molecular weight of the resulting product. Desirably, sufficient catalyst should be employed to provide from 0.001 to about 0.5 gram of active metal for each 100 grams of monomer in the polymerization mixture.

Since moisture tends to use up catalyst, it should be excluded from the reaction zone insofar as is possible. Oxygen, nitrogen and other components of the air seriously inhibit the desired polymerization reaction and consequently should be excluded from the reaction zone. In laboratory or small scale equipment, all of these substances conveniently may be removed by bringing the polymerization charge to a boil and venting a small proportion of the charge (e.g., about 10%) prior to sealing the reactor and effecting polymerization. In large scale production, however, charging of the reactor is preferably conducted under an inert atmosphere.

It has been found that the molecular weight and proportion of cis-1,4-structure of the polymers in accordance with the invention generally increases as the temperature of polymerization is decreased. Additionally, the reaction is quite difficult to control at elevated temperatures, particularly where monomer of the preferred highest purity is employed. It has also been found that gel content increases as higher polymerization temperatures are employed, especially with lithium containing catalysts. Consequently, it is desirable to operate at the lowest temperature at which a practical yield of the desired product may be obtained. Since polymerization reactions of the type contemplated ordinarily require a considerable induction period, it is often desirable to initiate the polymerization reaction at a higher temperature and then lower the temperature to the desired level by suitable cooling means once the polymerization reaction has been initiated. In this manner, the induction period will be lessened and the benefits of low temperature polymerization, as above indicated, may be obtained. In general, the copolymers of the invention are advantageously produced at temperatures between 0° C. and 150° C. A polymerization temperature of from 40° to 70° C. is preferred.

In accordance with the invention, the polymerization reaction is carried out in the presence of a suitable inert organic solvent. Solvents operable in the process whereby the copolymers of this invention are produced must be non-polar, non-acidic, organic substances. Suitable solvents include the saturated aliphatic hydrocarbon solvents, such as the straight and branched chain paraffins and cycloparaffins containing from 3 to 16 carbon atoms which include, without limitation, propane, pentane, hexane, petroleum ether, heptane, dodecane, cyclopentane, cyclohexane, methyl cyclohexane, and the like. Aromatic solvents such as benzene, toluene, xylene, and the like are also operable. The same considerations as to purity and absence of interfering compounds applying to the monomers also apply to the solvent. A treatment which has been found particularly advantageous for the purification of paraffin solvents, such as petroleum ether, consists of agitating the solvent with concentrated sulfuric acid and thereafter repeatedly washing with water. The solvent may then be suitably dehydrated by passage through silica gel, alumina, calcium chloride or other dehydrating or absorbing media, and thereafter distilled. As in the case of the monomer, the solvent after being purified desirably should be handled in contact only with its own vapor or with atmospheres containing only its vapor and inert gases such as helium and argon.

Laboratory scale polymerization reactions producing the copolymers of the invention may conveniently be conducted in glass beverage bottles sealed with aluminum lined crown caps. The polymerization bottles should be carefully cleaned and dried before use. The catalyst employed may be added to the bottle by weight, or, where possible, the catalyst can be melted and added by volume. In some instances, it is desirable to add the catalyst as a suspension in the monomer. The phosphite modifier can be added with the catalyst. The monomer is added by volume, desirably employing sufficient excess so that about 10% of the charge can be vented to remove moisture, oxygen and air from the bottle. The removal of oxygen from the free air space above the monomer in the polymerization bottle as well as dissolved oxygen in the monomer is an important step in the bottle loading procedure. The cap is placed loosely on the bottle and the monomer is brought to a vigorous boil as by placing the bottle on a heated sand bath. When approximately 10% of the charge has been vented the bottle is rapidly sealed. Such procedure substantially excludes the air and oxygen which drastically inhibit polymerization.

The sealed bottles may be placed on a polymerization wheel immersed in a liquid maintainted at a constant temperature, and rotated. Alternatively, the charge bottle may be allowed to stand stationary in a constant temperature bath or otherwise heated or cooled until the polymerization reaction is complete. Ordinarily, the static system which requires a considerably longer reaction, may in some instances be attractive where higher molecular weights are desired. After the induction period, the charge goes through a period of thickening and finally becomes solid. At the end of the polymerization reaction, when properly conducted, all of the monomer has been consumed and there is a partial vacuum in the free space of the reaction vessel.

The time for completion of polymerization varies with the temperature, the time required decreasing with increase in temperature, in any case being completed within 3–4 hours and at the highest temperatures in the cited range within ½ hour. Even at the lowest temperatures of this range substantial polymerization is effected within ½ hour.

After polymerization has been completed, and the bottle cooled to handling temperature, the polymer may be removed by cutting the bottle open. Preferably the crude polymer will be washed immediately on a wash mill to remove the catalyst. An antioxidant, for example, 3% phenyl-beta naphthylamine, is desirably added as soon as the catalyst has been destroyed and water washing is then resumed. Cold water will preferably be employed to minimize oxidation of the polymers. In order to recover the polymer with a minimum degree of oxidation, it is preferred that the polymer, after being removed from the reaction vessels, be immediately immersed in an alcohol, such as methanol, containing about 3% antioxidant. The methanol destroys the catalyst and carries the antioxidant into the polymer mass.

Corresponding techniques may be employed in large scale polymerization processes. Usually the reaction will be carried out in a closed autoclave provided with a heat transfer jacket and a rotary agitator. Avoidance of oxygen contamination is most easily secured by evacuating the vessel prior to charging the monomer (and solvent, if used) and employing an inert atmosphere. To insure the purity of the monomer and solvent, a silica gel or other suitable absorption column is preferably inserted in the charging line employed for introduction of these materials to the reactor. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature. Upon completion of polymerization, the product is removed and immersed under the surface of the body of methanol, isopropanol, or other alcohol containing an antioxidant, and agitated therewith to precipitate the polymer, destroy the catalyst and incorporate the antioxidant. The precipitated mass may be milled with water on a wash belt to remove the alcohol and additional antioxidant may be incorporated during this operation. The product is then dried for storage and use.

PREFERRED EMBODIMENTS

The invention is best described and illustrated by the following examples. These examples are presented merely for the purpose of illustration and are not intended in any way to restrict the scope of the invention or the manner in which it can be practiced. Except where otherwise indicated parts and percentages are given by weight.

Example 1

Into each of a series of 28 ounce beverage bottles there is placed hexane-butadiene (containing 25% by volume butadiene). To this is added 16 ml. of freshly distilled styrene monomer, and n-butyllithium and tri-n-butyl phosphite modifier are added in the amounts indicated in the table below. Each bottle is capped and placed in a polymerizer and maintained at a temperature of 50° C. for a period of 3 hours. The product is processed according to normal procedure and the product analyzed for percent styrene, by infrared analysis, percent block styrene by oxidation and percent 1,2-microstructure butadiene by infrared analysis. The results are tabulated below.

| Mmoles of phosphite | Butyllithium, mmole | Percent (IR) Styrene | Percent block styrene | Percent 1,2 |
|---|---|---|---|---|
| 0.00 | 0.70 | 25.00 | 12.00 | 9.0 |
| 0.34 | 0.10 | 24.5 | 0.0 | 13.7 |
| 0.70 | 0.70 | 14.9 | 0.0 | 12.1 |
| 0.8 | 1.55 | 19.1 | 0.0 | 13.8 |
| 0.8 | 1.55 | 24.4 | 0.0 | 11.5 |
| 0.40 | 1.55 | 13.5 | 0.0 | 15.3 |
| 1.0 | 4.28 | 19.6 | 0.0 | 10.7 |

Example 2

The procedure of Example 1 is repeated a number of times with similar results using individually in place of the tri-n-butyl phosphite an equivalent amount each of: triethyl phosphite, tri-n-hexyl phosphite, tricyclohexyl phosphite, triphenyl phosphite, tritolyl phosphite, tribenzyl phosphite, tri-n-butyl thiophosphite, triphenyl thiophosphite, tricycloheptyl thiophosphite, tri(dimethylamido) phosphite, tri(dihexylamido) phosphite, tri(diphenylamido) phosphite, tri(dicyclohexylamido) phosphite.

Example 3

The procedure of Example 1 is repeated a number of times with similar results using individually in place of the n-butyllithium an equivalent amount each of: propyl lithium, amyl lithium, n-dodecyl lithium, allyl lithium, phenyl lithium, benzyl lithium, tolyl lithium, alfin (allyl sodium).

Example 4

The procedure of Example 1 is repeated a number of times with results similar to those of Example 1 using individually in place of the butadiene an equivalent amount each of: isoprene, 2,3-dimethylbutadiene-1,3 and piperylene.

Example 5

The procedure of Example 1 is repeated a number of times with results similar to those of Example 1 using individually in place of the styrene an equivalent amount each of: vinyl naphthalene, vinyl toluene and α-methylstyrene.

Example 6

The procedure of Example 1 is repeated a number of times using individually in place of 50° C. the following respective temperatures: 10° C., 30° C., 80° C., 120° C. and 150° C. Similar results are obtained except that at the lower temperatures longer periods are required for completion of the polymerization and shorter periods at the higher temperatures.

Example 7

The procedure of Example 1 is repeated a number of times using variations in the amount of styrene so as to give 15%, 30% and 50% in the respective amounts. In each case similar results are obtained as in Example 1.

The dienes suitable for the practice of this invention can be represented by the formula

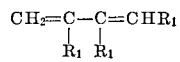

wherein $R_1$ represents hydrogen and alkyl or an aryl radical, preferably one having no more than 7 carbon atoms.

Suitable alkenyl aryl compounds are represented by the formula

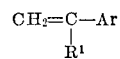

wherein $R^1$ represents hydrogen or methyl, so that the alkenyl group includes vinyl and α-methylvinyl or isopropenyl, and Ar represents phenyl, naphthyl and the alkyl, cycloalkyl, aryl, alkaryl, aralkyl, alkoxy, aryloxy and dialkylamino derivatives of pheny and naphthyl, with the total number of carbon atoms in the derivative groups not exceeding 12.

As previously indicated the polymerization is advantageously performed in a non-polar, non-acidic solvent, preferably a hydrocarbon such as those illustrated above. While the polymerization can be performed without solvent in which case the polymerization product is deposited as a rubbery mass, or the polymerization can be terminated well before completion in order to have unreacted monomer serve as suspension medium, generally, however, about 25–50% by volume of solvent is used, based on the total volume.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A process for preparing copolymers comprising the step of polymerizing at a temperature of 0°–150° C. a monomeric composition consisting essentially of:
   (a) at least one conjugated diene having the formula

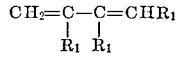

wherein $R_1$ represents a member of the class consisting of hydrogen, alkyl and aryl radicals having no more than 7 carbon atoms,
   (b) at least one alkenyl aryl compound having the formula

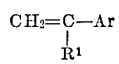

wherein R' represents a member of the class consisting of hydrogen and methyl, and Ar represents phenyl, naphthyl and the alkyl, cycloalkyl, aryl, alkaryl, aralkyl, alkoxy, aryloxy and dialkylamino derivatives of said phenyl and naphthyl, the total number of carbon atoms in the combined derivative groups being not greater than 12,
   (c) an active lithium compound, in an amount to provide 0.001–0.5 part of active lithium per each 100 parts by weight of said monomeric composition, said lithium compound having 1–4 lithium atoms per molecule and having said lithium attached to a radical selected from the class consisting of aliphatic, cycloaliphatic and aromatic hydrocarbon radicals, and
   (d) a phosphite modifier selected from the class consisting of $(RO)_3P$, $(RS)_3P$ and $(R_2N)_3P$ wherein R is a hydrocarbon radical of 1–12 carbon atoms, said phosphite modifier being used in an amount of 0.25–2 millimoles of phosphite per millimole of lithium catalyst compound, and thereafter recovering the rubbery copolymer thus produced.

2. The process of claim 1 in which said temperature is 40°–70° C.

3. The process of claim 2 in which said diene is butadiene-1,3.

4. The process of claim 3 in which said alkenyl aromatic compound is styrene.

5. The process of claim 2 in which said diene is isoprene.

6. The process of claim 2 in which said diene is piperylene.

7. The process of claim 2 in which said diene is 2,3-dimethyl-1,3-butadiene.

8. The process of claim 2 in which said catalyst is an alkyllithium.

9. The process of claim 1 in which said phosphite is $(RO)_3P$.

10. The process of claim 1 in which said phosphite is $(RS)_3P$.

11. The process of claim 1 in which said phosphite is $(R_2N)_3P$.

12. The process of claim 1 in which said phosphate is $(RO)_3P$, said diene is butadiene-1,3 and said alkenyl aromatic compound is styrene.

13. The process of claim 12 in which said polymerization is effected at a temperature of 40°–70° C.

14. The process of claim 12 in which said polymerization is catalyzed by an alkyllithium.

15. The process of claim 13 in which said alkyl lithium is n-butyllithium.

References Cited

UNITED STATES PATENTS

| | | | |
|---|---|---|---|
| 2,975,160 | 3/1961 | Zelinski | 260—83.7 |
| 3,094,512 | 6/1963 | Short | 260—83.7 |
| 3,294,768 | 12/1966 | Wofford | 260—83.7 |
| 3,288,872 | 11/1966 | House | 260—84.7 |

JAMES A. SEIDLECK, Primary Examiner

U.S. Cl. X.R.

260—84.3, 84.7

PO-1050
(5/69)

UNITED STATES PATENT OFFICE
CERTIFICATE OF CORRECTION

Patent No. 3,506,631      Dated April 14, 1970

Inventor(s) Adel F. Halasa

It is certified that error appears in the above-identified patent and that said Letters Patent are hereby corrected as shown below:

Col. 1, line 30, "(RS)$_3$" should read --(RS)$_3$P--

Col. 3, line 32, "aikaryl" should read --alkaryl--

Col. 7, in the table at top of page, second item under heading "Butyllithium, mmole", "0.10" should read --0.70--

Col. 8, line 1, "pheny" should read --phenyl--

SIGNED AND
SEALED
SEP 22 1970

(SEAL)
Attest:

Edward M. Fletcher, Jr.
Attesting Officer

WILLIAM E. SCHUYLER, JR.
Commissioner of Patents